(12) United States Patent
Kresnyak

(10) Patent No.: US 9,212,319 B2
(45) Date of Patent: Dec. 15, 2015

(54) ENHANCEMENT OF FISCHER-TROPSCH PROCESS FOR HYDROCARBON FUEL FORMULATION IN A GTL ENVIRONMENT

(71) Applicant: Steve Kresnyak, Calgary (CA)

(72) Inventor: Steve Kresnyak, Calgary (CA)

(73) Assignee: Expander Energy Inc., Calgary (CA)

( * ) Notice: Subject to any disclaimer, the term of this patent is extended or adjusted under 35 U.S.C. 154(b) by 0 days.

(21) Appl. No.: 13/887,342

(22) Filed: May 5, 2013

(65) Prior Publication Data
US 2014/0206780 A1 Jul. 24, 2014

(30) Foreign Application Priority Data

May 9, 2012 (CA) .................................... 2776369

(51) Int. Cl.
| | | |
|---|---|---|
| C10G 2/00 | (2006.01) | |
| C01B 3/38 | (2006.01) | |
| C10L 1/04 | (2006.01) | |
| C10L 1/08 | (2006.01) | |
| C10L 3/10 | (2006.01) | |

(52) U.S. Cl.
CPC ... *C10G 2/30* (2013.01); *C01B 3/38* (2013.01); *C10L 1/04* (2013.01); *C10L 1/08* (2013.01); *C10L 3/10* (2013.01); *C01B 2203/0233* (2013.01); *C01B 2203/0244* (2013.01); *C01B 2203/062* (2013.01); *C01B 2203/1241* (2013.01); *C10G 2300/1025* (2013.01); *C10G 2300/4081* (2013.01); *C10G 2300/42* (2013.01); *C10G 2400/04* (2013.01); *C10G 2400/08* (2013.01)

(58) Field of Classification Search
CPC ....................................................... C10G 2/30
See application file for complete search history.

(56) References Cited

U.S. PATENT DOCUMENTS

| | | | |
|---|---|---|---|
| 2,574,469 A | 11/1951 | Dressler et al. | |
| 3,351,563 A | 11/1967 | Negra et al. | |
| 3,941,820 A | 3/1976 | Jackson et al. | |
| 4,217,112 A | 8/1980 | Johanson | |
| 4,234,412 A | 11/1980 | Boersma et al. | |

(Continued)

FOREIGN PATENT DOCUMENTS

| | | |
|---|---|---|
| CA | 2320509 | 8/1999 |
| CA | 2595880 | 12/2005 |

(Continued)

OTHER PUBLICATIONS

Natural Gas Processing: The Crucial Link Between Natural Gas Production and its Transportation to Market; Published Jan. 2006, pp. 1-11.*

(Continued)

*Primary Examiner* — Jafar Parsa
*Assistant Examiner* — Medhanit Bahta
(74) *Attorney, Agent, or Firm* — MBM Intellectual Property Law

(57) ABSTRACT

An enhanced natural gas processing method using Fischer-Tropsch (FT) process for the synthesis of sulfur free, clean burning, hydrocarbon fuels, examples of which include syn-diesel and aviation fuel. A selection of natural gas, separately or combined with portions of natural gas liquids and FT naphtha and FT vapors are destroyed in a syngas generator and used or recycled as feedstock to an Fischer-Tropsch (FT) reactor in order to enhance the production of syndiesel from the reactor. The process enhancement results is the maximum production of formulated syndiesel without the presence or formation of low value by-products.

26 Claims, 8 Drawing Sheets

(56) References Cited

U.S. PATENT DOCUMENTS

| | | | |
|---|---|---|---|
| 4,758,375 A * | 7/1988 | Brophy | C01B 3/44 252/373 |
| 4,806,699 A * | 2/1989 | Smith et al. | 585/314 |
| 5,378,348 A | 1/1995 | Davis et al. | |
| 5,494,653 A | 2/1996 | Paisley | |
| 6,043,288 A | 3/2000 | DeGeorge et al. | |
| 6,048,449 A | 4/2000 | Bogdan et al. | |
| 6,183,627 B1 | 2/2001 | Friday et al. | |
| 6,241,874 B1 | 6/2001 | Wallace et al. | |
| 6,306,917 B1 | 10/2001 | Bohn et al. | |
| 6,395,944 B1 | 5/2002 | Griffiths et al. | |
| 6,512,018 B2 | 1/2003 | Kennedy | |
| 6,531,516 B2 | 3/2003 | Davis et al. | |
| 6,540,023 B2 | 4/2003 | Davis et al. | |
| RE38,170 E | 7/2003 | DeGeorge et al. | |
| 6,596,780 B2 | 7/2003 | Jahnke et al. | |
| 6,602,404 B2 | 8/2003 | Walsh et al. | |
| 6,656,343 B2 | 12/2003 | Dancuart | |
| 6,693,138 B2 | 2/2004 | O'Rear | |
| 6,696,501 B2 | 2/2004 | Schanke et al. | |
| 6,702,936 B2 | 3/2004 | Rettger et al. | |
| 6,730,285 B2 | 5/2004 | Aasberg-Petersen et al. | |
| 6,765,025 B2 | 7/2004 | Ding et al. | |
| 6,863,802 B2 | 3/2005 | O'Rear et al. | |
| 6,872,753 B2 | 3/2005 | Landis et al. | |
| 6,958,363 B2 | 10/2005 | Espinoza et al. | |
| 7,004,985 B2 | 2/2006 | Wallace et al. | |
| 7,168,265 B2 * | 1/2007 | Briscoe et al. | 62/611 |
| 7,208,530 B2 | 4/2007 | Norbeck et al. | |
| 7,214,720 B2 | 5/2007 | Bayle et al. | |
| 7,381,320 B2 | 6/2008 | Iqbal et al. | |
| 7,407,571 B2 | 8/2008 | Rettger et al. | |
| 7,413,647 B2 | 8/2008 | Calderon et al. | |
| 7,566,394 B2 | 7/2009 | Koseoglu | |
| 7,677,309 B2 | 3/2010 | Shaw et al. | |
| 7,708,877 B2 | 5/2010 | Farshid et al. | |
| 7,749,378 B2 | 7/2010 | Iqbal et al. | |
| 7,776,114 B2 | 8/2010 | Rüger et al. | |
| 7,795,317 B2 | 9/2010 | Ellers et al. | |
| 7,795,318 B2 | 9/2010 | Van Hardeveld | |
| 7,846,979 B2 | 12/2010 | Rojey et al. | |
| 7,855,235 B2 | 12/2010 | Van Hardeveld | |
| 7,863,341 B2 | 1/2011 | Routier | |
| 7,879,919 B2 | 2/2011 | Ernst et al. | |
| 2001/0051662 A1 | 12/2001 | Arcuri et al. | |
| 2004/0091409 A1 | 5/2004 | Allison | |
| 2004/0181313 A1 | 9/2004 | Mohedas et al. | |
| 2005/0113464 A1 | 5/2005 | O'Rear et al. | |
| 2005/0173305 A1 | 8/2005 | Smith | |
| 2005/0250862 A1 | 11/2005 | Bayle et al. | |
| 2006/0167118 A1 | 7/2006 | Tijm et al. | |
| 2006/0231455 A1 | 10/2006 | Olsvik et al. | |
| 2008/0021119 A1 | 1/2008 | Norbeck et al. | |
| 2008/0021122 A1 | 1/2008 | Norbeck et al. | |
| 2008/0115415 A1 | 5/2008 | Agrawal et al. | |
| 2008/0116111 A1 | 5/2008 | Newton et al. | |
| 2009/0084707 A1 | 4/2009 | Gil et al. | |
| 2009/0186952 A1 | 7/2009 | Steynberg et al. | |
| 2009/0200209 A1 | 8/2009 | Sury et al. | |
| 2009/0261587 A1 | 10/2009 | Lomax | |
| 2009/0292571 A1 | 11/2009 | Gil et al. | |
| 2010/0000153 A1 | 1/2010 | Kurkjian et al. | |
| 2010/0036181 A1 | 2/2010 | Diebold et al. | |
| 2010/0113624 A1 | 5/2010 | Routier et al. | |
| 2010/0137458 A1 | 6/2010 | Erling et al. | |
| 2010/0144905 A1 | 6/2010 | Reaveley et al. | |
| 2010/0216898 A1 | 8/2010 | Tonseth et al. | |
| 2011/0009501 A1 | 1/2011 | Ernst et al. | |
| 2011/0049016 A1 | 3/2011 | McGrady et al. | |
| 2012/0152120 A1 | 6/2012 | Davis | |
| 2012/0208902 A1 | 8/2012 | Kresnyak | |

FOREIGN PATENT DOCUMENTS

| | | |
|---|---|---|
| CA | 2657656 | 1/2008 |
| CA | 2731376 | 6/2010 |
| CA | 2737872 | 4/2011 |
| CA | 2809503 | 3/2013 |
| EP | 1608924 | 9/2007 |
| JP | 2002060762 | 2/2002 |
| JP | 2003183004 | 7/2003 |
| JP | 2007297443 | 11/2007 |
| JP | 2007512328 | 10/2010 |
| WO | WO 2005000736 A1 * | 1/2005 |
| WO | 2010119973 | 10/2010 |

OTHER PUBLICATIONS

Stockle, M. et al. Hydrocarbon Processing Feb. 2010, 89, pp. 55-60; pp. 1-11 of the pdf file.*
CA Office Action for Application No. 2,843,088, dated Aug. 11, 2014.
PCT Search Report for PCT/CA/2013/000444, dated Aug. 8, 2013.
PCT Search Report for PCT/CA2011/001017, dated Apr. 5, 2012.
CA Office Action for Application No. 2,751,615, dated Dec. 17, 2012.
S. Rossini, FT Gasifier Integration and Scale, Summer School "Next Generation Biofuels", Sep. 2009, p. 1-102, Bologna.
Ronald (Ron) F. Colwell, P.E., Oil Refinery Processes, Process Engineering Associates, LLC, 2009, pp. 1-36.
Review of Technologies for Gasification of Biomass and Wastes, NNFCC Project 09/008, Jun. 2009, pp. 1-126.
Harold Boerrigter et al., Green Diesel from Biomass by Fischer-Tropsch Synthesis: New Insights Gas Cleaning and Process Design, Oct. 2002, pp. 1-15.
An Information Guide on Pursuing Biomass Energy Opportunities and Technologies in British Columbia, Biocap, Feb. 7, 2008, pp. 1-80, British Columbia.
Schaberg, Paul, Application of Synthetic Diesel Fuels, Sasol, Aug. 2005, pp. 1-16, Chicago.
SynDiesel B5 Synthetically made Diesel Fuel, with a 60 Cetane Rating, Storage Life of up to 10 years and 10% more BTU"s than Conventional Diesel, Feb. 14, 2011, pp. 1-2.
Service Offering from Axens IFP Group Technologies, Feb. 2, 2011, p. 1.
Larson, Eric D. et al., Biomass Conversion to Fischer-Tropsch Liquids: Preliminary Energy Balances, Centre for Energy and Environmental Studies, Princeton University, pp. 1-8, Sep. 2, 1999.
Fedou, Stephane et al., Conversion of Syngas to Diesel, pp. 1-5, 2008.
James H. Gary et al., Petroleum Refining Chemical Processing and Engineering, pp. 65-73, vol. 5, Mar. 5, 2007.
Herbert M. Kosstrin, Ph.D., Advances in Liquid Fuel Production, Science Applications International Corporation (SAIC), pp. 1-11, Nov. 4, 2010.
Alexandre Rojey et al., Combined Production of Hydrogen, Clean Power and Quality Fuels, Institute Francais du Petrole, pp. 1-5, 2003.
Hercilio Rivas et al., Bitamen in Water Biomodal Emulsions Stabilized by Natural Surfactants, pp. 1-11, 1998.
Arun S.K. Raju et al., Estimation of Synthetic Diesel Fuel production from California's carbonaceous waste streams using steam hydrogasification, pp. 1-7, Apr. 10, 2008.
Alter NGR Corp., Fox Creek Coal Gasification Project, Public Disclosure Document, pp. 1-23, Jul. 21, 2008.
US Office Action for U.S. Appl. No. 14/540,084 dated May 20, 2015.
US Office Action for U.S. Appl. No. 13/228,042 dated May 20, 2014.
Notice of Allowance for U.S. Appl. No. 13/228,042 dated Aug. 20, 2014.
Restriction Requirement for U.S. Appl. No. 13/228,042 dated Dec. 3, 2013.
US Office Action for U.S. Appl. No. 13/024,925 dated Nov. 6, 2014.
Restriction Requirement for U.S. Appl. No. 13/024,925 dated Apr. 11, 2013.
Notice of Allowance for U.S. Appl. No. 13/024,925 dated Apr. 27, 2015.

* cited by examiner

ENHANCEMENT OF FISCHER-TROPSCH PROCESS FOR HYDROCARBON FUEL FORMULATION IN A GTL ENVIRONMENT

FIELD OF THE INVENTION

The present invention relates to the modification of the Fischer-Tropsch sequence of operations including the Fischer-Tropsch process for the production of hydrocarbon fuels in an efficient manner.

BACKGROUND OF THE INVENTION

In the prior art, the Fischer-Tropsch process has been used for decades to assist in the formulation of hydrocarbons. In the last several years, this has become a concern giving the escalating environmental concerns regarding pollution together with the increasing costs of hydrocarbon exploration and refining and the increasing surplus supply of natural gas. The major producers in this area have expanded the art significantly in this technological area with a number of patented advances and pending applications in the form of publications.

In the art, advances made in terms of the raw materials that have been progenitor materials for the Fischer-Tropsch process, have included, for example, coal-to-liquid (CTL), bio-to-liquid (BTL) and gas-to-liquid (GTL). One of the more particularly advantageous features of the gas-to-liquid (GTL) technology is the fact that it presents a possibility to formulate a higher value environmentally beneficial synthetic diesel product or syndiesel from stranded natural gas and natural gas liquid reserves, which would otherwise have not been commercially or otherwise feasible to bring to market. As is generally known, the Fischer-Tropsch (FT) process converts hydrogen and carbon monoxide (commonly known as syngas) into liquid hydrocarbon fuels, examples of which include synthetic diesel, naphtha, kerosene, aviation or jet fuel and paraffinic wax. As a precursory step, the natural gas and natural gas liquids are thermally converted using heat and pressure in the presence of catalyst to produce a hydrogen rich syngas containing hydrogen and carbon monoxide. As a result of the Fischer-Tropsch technique, the synthetic fuels are very appealing from an environmental point of view, since they are paraffinic in nature and substantially devoid of contamination. This is particularly true in the case of the diesel fuel synthesis where the synthetic product has ideal properties for diesel engines, including extremely high cetane rating >70, negligible aromatics and sulphur content, in addition to enabling optimum combustion and virtually emission free operation. Synthetic diesel or syndiesel fuels significantly reduce nitrous oxide and particulate matter and are an efficient transportation fuel with lower green house gas (GHG) emissions, when compared with petroleum based diesel fuel and other transportation fuels. The syndiesel fuels can also be very effective in that they can be added to petroleum based diesel fuels to enhance their performance.

One example of recent advances that have been made in this area of technology includes the features taught in U.S. Pat. No. 6,958,363, issued to Espinoza, et al., Oct. 25, 2005. In the document, Espinoza et al. provide for hydrogen use in a GTL plant.

In essence, the patent teaches a process for synthesizing hydrocarbons where initially, a synthesis gas stream is formulated in a syngas generator. The synthesis gas stream comprises primarily hydrogen and carbon monoxide. The process involves catalytically converting the synthesis gas stream in a synthesis reaction to produce hydrocarbons and water followed by the generation of hydrogen-rich stream in the hydrogen generator. The process indicates that the hydrogen generator is separate from the syngas generator (supra) and that the hydrogen generator comprises either a process for converting hydrocarbons to olefins, a process for catalytically dehydrogenating hydrocarbons, or a process for refining petroleum, and a process for converting hydrocarbons to carbon filaments. The final step in the process in its broadest sense, involves consumption of hydrogen from the hydrogen-rich stream produced in one or more processes that result and increase value of the hydrocarbons or the productivity of the conversion of the hydrocarbons from the earlier second mentioned step.

Although a useful process, it is evident from the disclosure of Espinoza et al. that there is a clear intent to create olefins such as ethylene and propylene for petrochemical use, and aromatics for gasoline production. Additionally, there is a reforming step indicated to include the reformation of naphtha feedstock to generate a net surplus hydrogen by-product which is then recombined into the process. The naphtha is subsequently converted to aromatics for high octane gasoline blend stock. There is no specific contemplation and therefore no discussion of effectively destroying the naphtha for purposes of enhancing the Fischer-Tropsch process which, in turn, results in the significant augmentation of hydrocarbon synthesis.

The Espinoza et al. process is an excellent gas to a liquid process link to gasoline production from natural gas using naphtha reformation to make the gasoline product. In the disclosure, it was discovered that the excess hydrogen could be used to enhance the productivity of conversion.

A further significant advancement in this area of technology is taught by Bayle et al., in U.S. Pat. No. 7,214,720, issued May 8, 2007. The reference is directed to the production of liquid fuels by a concatenation of processes for treatment of a hydrocarbon feedstock.

It is indicated in the disclosure that the liquid fuels begin with the organic material, typically biomass as a solid feedstock. The process involves a stage for the gasification of the solid feedstock, a stage for purification of synthesis gas and subsequently a stage for transformation of the synthesis gas into a liquid fuel.

The patentees indicate in column 2 the essence of the technology:

"A process was found for the production of liquid fuels starting from a solid feedstock that contains the organic material in which:
a) The solid feedstock is subjected to a gasification stage so as to convert said feedstock into synthesis gas comprising carbon monoxide and hydrogen,
b) the synthesis gas that is obtained in stage a) is subjected to a purification treatment that comprises an adjustment for increasing the molar ratio of hydrogen to carbon monoxide, $H_2/CO$, up to a predetermined value, preferably between 1.8 and 2.2,
c) the purified synthesis gas that is obtained in stage b) is subjected to a conversion stage that comprises the implementation of a Fischer-Tropsch-type synthesis so as to convert said synthesis gas into a liquid effluent and a gaseous effluent,
d) the liquid effluent that is obtained in stage c) is fractionated so as to obtain at least two fractions that are selected from the group that consists of: a gaseous fraction, a naphtha fraction, a kerosene fraction, and a gas oil fraction, and
e) at least a portion of the naphtha fraction is recycled in gasification stage."

Although a meritorious procedure, the overall process does not result in increased production of hydrocarbons. The naphtha recycle stream that is generated in this process is introduced into the gasification stage. This does not directly augment the syngas volume to the Fischer-Tropsch reactor which results in increased volumes of hydrocarbons being produced giving the fact that the feedstock is required for the process. To introduce the naphtha to the gasification stage as taught in Bayle et al., is to modify the $H_2/CO$ ratio in the gasification stage using an oxidizing agent such as water vapour and gaseous hydrocarbon feedstocks such as natural gas with the recycled naphtha, while maximizing the mass rate of carbon monoxide and maintain sufficient temperature above 1000° C. to 1500° C. in the gasification stage to maximize the conversion of tars and light hydrocarbons.

In U.S. Pat. No. 6,696,501, issued Feb. 24, 2004, to Schanke et al., there is disclosed an optimum integration process for Fischer-Tropsch synthesis and syngas production.

Among other features, the process instructs the conversion of natural gas or other fossil fuels to higher hydrocarbons where the natural gas or the fossil fuels is reacted with steam and oxygenic gas in a reforming zone to produce synthesis gas which primarily contains hydrogen, carbon monoxide and carbon dioxide. The synthesis gas is then passed into a Fischer-Tropsch reactor to produce a crude synthesis containing lower hydrocarbons, water and non-converted synthesis gas. Subsequently, the crude synthesis stream is separated in a recovery zone into a crude product stream containing heavier hydrocarbons, a water stream and a tail gas stream containing the remaining constituents. It is also taught that the tail gas stream is reformed in a separate steam reformer with steam and natural gas and then the sole reformed tail gas is introduced into the gas stream before being fed into the Fischer-Tropsch reactor.

In the reference, a high carbon dioxide stream is recycled back to an ATR in order to maximize the efficiency of the carbon in the process. It is further taught that the primary purpose of reforming and recycling the tail gas is to steam reform the lower hydrocarbons to carbon monoxide and hydrogen and as there is little in the way of light hydrocarbons, adding natural gas will therefore increase the carbon efficiency. There is no disclosure regarding the destruction of naphtha in an SMR or ATR to generate an excess volume of syngas with subsequent recycle to maximize hydrocarbon production. In the Schanke et al. reference, the patentees primarily focused on the production of the high carbon content syngas in a GTL environment using an ATR as crude synthesis stream and reforming the synthesis tail gas in an SMR with natural gas addition to create optimum conditions that feed to the Fischer-Tropsch reactor.

In respect of other progress that has been made in this field of technology, the art is replete with significant advances in, not only gasification of solid carbon feeds, but also methodology for the preparation of syngas, management of hydrogen and carbon monoxide in a GTL plant, the Fischer-Tropsch reactors management of hydrogen, and the conversion of biomass feedstock into hydrocarbon liquid transportation fuels, inter alia. The following is a representative list of other such references. This includes: U.S. Pat. Nos. 7,776,114; 6,765,025; 6,512,018; 6,147,126; 6,133,328; 7,855,235; 7,846,979; 6,147,126; 7,004,985; 6,048,449; 7,208,530; 6,730,285; 6,872,753, as well as United States Patent Application Publication Nos. US2010/0113624; US2004/0181313; US2010/0036181; US2010/0216898; US2008/0021122; US 2008/0115415; and US 2010/0000153.

SUMMARY OF THE INVENTION

One object of the present invention is to provide an improved Fischer-Tropsch based synthesis process for synthesizing hydrocarbons with a substantially increased yield.

In one embodiment of the present invention there is provided a process for synthesizing hydrocarbons, comprising:
a) formulating a hydrogen rich stream with a syngas generator;
b) catalytically converting said stream to produce hydrocarbons, containing at least naphtha;
c) recycling at least a portion of said naphtha to said syngas generator to form an enhanced hydrogen rich stream; and
d) re-circulating said enhanced hydrogen rich stream from step (c) for conversion in step (b) to enhance the synthesis of hydrocarbons.

The present technology provides a very elegant solution to ameliorate the shortcomings that have been clearly evinced in the prior art references. Despite the fact that the prior art, in the form of patent publications, issued patents, and other academic publications, all recognize the usefulness of a Fischer-Tropsch process, steam methane reforming, autothermal reforming, naphtha recycle, and other processes, the prior art when taken individually or when mosaiced is deficient a process that provides for the synthesis of a hydrogen rich stream in a syngas generator and reaction in a Fischer-Tropsch or suitable reactor for the purpose of enhancing the production of, as one example, diesel fuel or aviation fuel. As is well known, the Fischer-Tropsch process is particularly useful since the resultant synthetic fuel is "clean" fuel and does not have the contamination level typically associated with the same petroleum based fuel.

The present invention amalgamates, in a previously unrecognized combination, a series of known unit operations into a much improved synthesis route for production of synthetic hydrocarbon fuels. This process engages a counter-intuitive step, namely, the removal of a production fraction, namely the naphtha, which, despite being a refined product, is then effectively destroyed making use of the naphtha as a feedstock for a syngas generator and then recycled into the Fischer-Tropsch process. This keystone unit operation is propitious since it works in concert with all of the other precursor operations which, of their own right, are highly effective.

It has been discovered that by employing the naphtha product fraction as a recycled feedstock to the syngas generator, shown in the example and discussed hereinafter in greater detail, as an autothermal reformer (ATR) or steam methane reformer (SMR) or combination thereof, results in an increase in the volume of diesel, or as it is more effectively referred to in the art, as syndiesel.

In accordance with an embodiment of the instant methodology, the process may include an autothermal reforming unit (ATR) operation as a syngas generator. As is well known to those skilled in the art, autothermal reforming employs carbon dioxide and oxygen, or steam, in a reaction with light hydrocarbon gases like natural gas to form syngas. This is an exothermic reaction in view of the oxidation procedure. When the autothermal reformer employs carbon dioxide, the hydrogen to carbon monoxide ratio produced is 1:1 and when the autothermal reformer uses steam, the ratio produced is approximately 2.5:1. One of the more significant benefits of using the ATR is realized in the variability of the hydrogen to carbon monoxide ratio.

The reactions that are incorporated in the autothermal reformer are as follows:

$$2CH_4+O_2+CO_2 \rightarrow 3H_2+3CO+H_2O+HEAT.$$

When steam is employed, the reaction equation is as follows:

$$4CH_4+O_2+2H_2O+HEAT \rightarrow 10H_2+4CO.$$

In accordance with a further embodiment of the instant methodology, the process may include a steam methane reformer (SMR) operation as a syngas generator. As is well known to those skilled in the art, steam methane reforming employs steam in a reaction with light hydrocarbon gases like natural gas and pre-reformed naphtha to form syngas in an indirect fired heater configuration. This is an endothermic reaction where external heat energy is required to support the reaction.

The primary reaction that is incorporated in the steam methane reformer is as follows:

$$\text{Natural Gas}+\text{Naphtha}+\text{Steam}+\text{Heat} \rightarrow CO+nH_2+CO_2$$

With the steam methane reformer, the hydrogen to carbon monoxide ratio produced ranges from 3:1 to 5:1. One of the more significant benefits of using the SMR is realized in the capability of generating relatively high hydrogen to carbon monoxide ratios, particularly attractive where excess hydrogen is needed for other operations, such as for the hydrocarbon upgrader.

A further discovery materialized from making use of, for example, light hydrocarbon gas as by-product from the Fischer-Tropsch reaction and hydrocarbon upgrader processing, commonly known as FT Tailgas and Upgrader offgases, or combined to form a refinery fuel gas, as a recycled feedstock to the ATR, SMR or combination thereof together with the naphtha recycle feedstock, resulted in a significant increase in the volume of syndiesel fuel produced. By way of example, by employing the combination of SMR and ATR with naphtha recycle, and the recycled refinery fuel gases, the process is capable of converting at least 50% or greater of all the carbon introduced to the process to syndiesel with an increase in production of syndiesel and synthetic jet fuel, as compared to conventional Fischer-Tropsch operation and without the production of any hydrocarbon by-products. This obviously has significant economic benefits.

Accordingly, a further aspect of one embodiment of the present invention is to provide a process for synthesizing hydrocarbons, comprising the steps of:
providing a source of hydrocarbons at least containing naphtha,
recycling the naphtha to a syngas generator to form hydrogen rich stream; and
catalytically converting the hydrogen rich stream to synthesize hydrocarbons.

In accordance with a further aspect of one embodiment of the present invention, there is provided an improved gas to liquids circuit, the improvement comprising:
recycling formed naphtha to the syngas generator to form a hydrogen rich stream with subsequent catalytic conversion.

With the broad applicability of the technology discussed herein, the amalgamation of the GTL process to a conventional hydrocarbon liquids extraction plant facilitates transformation of the low value natural gas byproducts to beneficially economic synthetic fuels.

In accordance with a further aspect of one embodiment of the present invention, there is provided a method for converting natural gas byproducts to synthetic fuel, comprising:
providing a source of natural gas containing byproducts,
extracting byproduct fractions from the natural gas; and
converting at least a portion of the fractions to synthetic fuel by use as a feedstock to a fuel synthesis circuit.

In accordance with a further aspect of one embodiment of the present invention, there is provided a method for converting natural gas byproducts to at least one of synthetic diesel and synthetic jet fuel, comprising:
providing a source of natural gas,
providing a hydrocarbon extraction gas plant and a gas to liquids plant incorporating a Fischer-Tropsch reactor;
extracting, in said hydrocarbon extraction gas plant, a gas phase and a hydrocarbon liquid phase from the natural gas;
fractioning the hydrocarbon liquid phase to generate methane, ethane, propane, butane and pentanes plus (commonly referred to as condensate) and mixtures thereof as a feedstock;
feeding the feedstock to the gas to liquids plant for reaction in the Fischer-Tropsch reactor; and
converting at least a portion of the feedstock to at least one of the synthetic diesel and synthetic jetfuel.

By augmenting the natural gas with a secondary or ancillary feedstock fuel such as a natural gas byproduct or combination of some or all thereof, significant yield increases in synthetic fuel production have been realized. In this manner, the low value byproducts used as a feedstock in an integral GTL and hydrocarbon liquid extraction plant are of particular benefit.

In accordance with a further aspect of one embodiment of the present invention, there is provided a method for increasing the volume yield of syndiesel produced in a gas to liquids processing circuit having syngas generator, syngas conditioning circuit and upgrading circuit, comprising:
providing a source of natural gas;
generating methane, ethane, propane, butane, condensate and mixtures thereof from at least one of a portion of the source of natural gas as an ancillary feedstock for the syngas generator;
feeding the ancillary feedstock to the syngas generator in addition to the natural gas; and
formulating syndiesel in a yield greater than in the absence of introduction of the ancillary feedstock into the syngas generator.

In accordance with a further aspect of one embodiment of the present invention, there is provided a method for increasing the volume yield of syndiesel produced in a gas to liquids processing circuit having syngas generator, syngas conditioning circuit and upgrading circuit, comprising:
providing a source of natural gas;
generating methane, ethane, propane, butane, condensate and mixtures thereof from at least one of a portion of the source of natural gas as primary feedstock for the syngas generator;
feeding the primary feedstock to the syngas generator; and
formulating syndiesel in a yield greater than in the absence of introduction of the primary feedstock into the syngas generator.

In accordance with a further aspect of one embodiment of the present invention, there is provided a process for synthesizing hydrocarbons, comprising the steps of:
providing a source of natural gas containing byproducts;
extracting byproduct fractions from the natural gas;
providing at least a portion of any of the fractions for use as a feedstock to a syngas generator
formulating a hydrogen rich stream with a syngas generator;
catalytically converting the stream to produce hydrocarbons, containing at least naphtha;
recycling at least a portion of the naphtha to the syngas generator to form an enhanced hydrogen rich stream; and re-circulating the enhanced hydrogen rich stream for conversion into enhance the synthesis of hydrocarbons.

Copious advantages flow from practicing the technology of this application, exemplary of which are:

a) high quality diesel product or additive;
b) high quality diesel and jet fuel with an absence of sulfur;
c) absence of petroleum by-products or low value feedstocks such as naphtha, ethane, propane and butane;
d) low emission and clean burning diesel and jet fuel;
e) increased cetane rating with concomitant augmented performance;
f) significant volume output of diesel/jet fuel compared to conventional processes using a Fischer-Tropsch reactor;
g) use of natural gas byproducts for synthesizing high quality synthetic fuels; and
h) increased yield of synthetic fuel production by use of natural gas byproducts with or without natural gas.

Referring now to the drawings as they generally describe the invention, reference will now be made to the accompanying drawings illustrating preferred embodiments and in which:

The dashed lines used in the Figures denote optional operations.

INDUSTRIAL APPLICABILITY

The present invention has applicability in the fuel synthesis art.

BEST MODE FOR CARRYING OUT THE INVENTION

Figure 1:
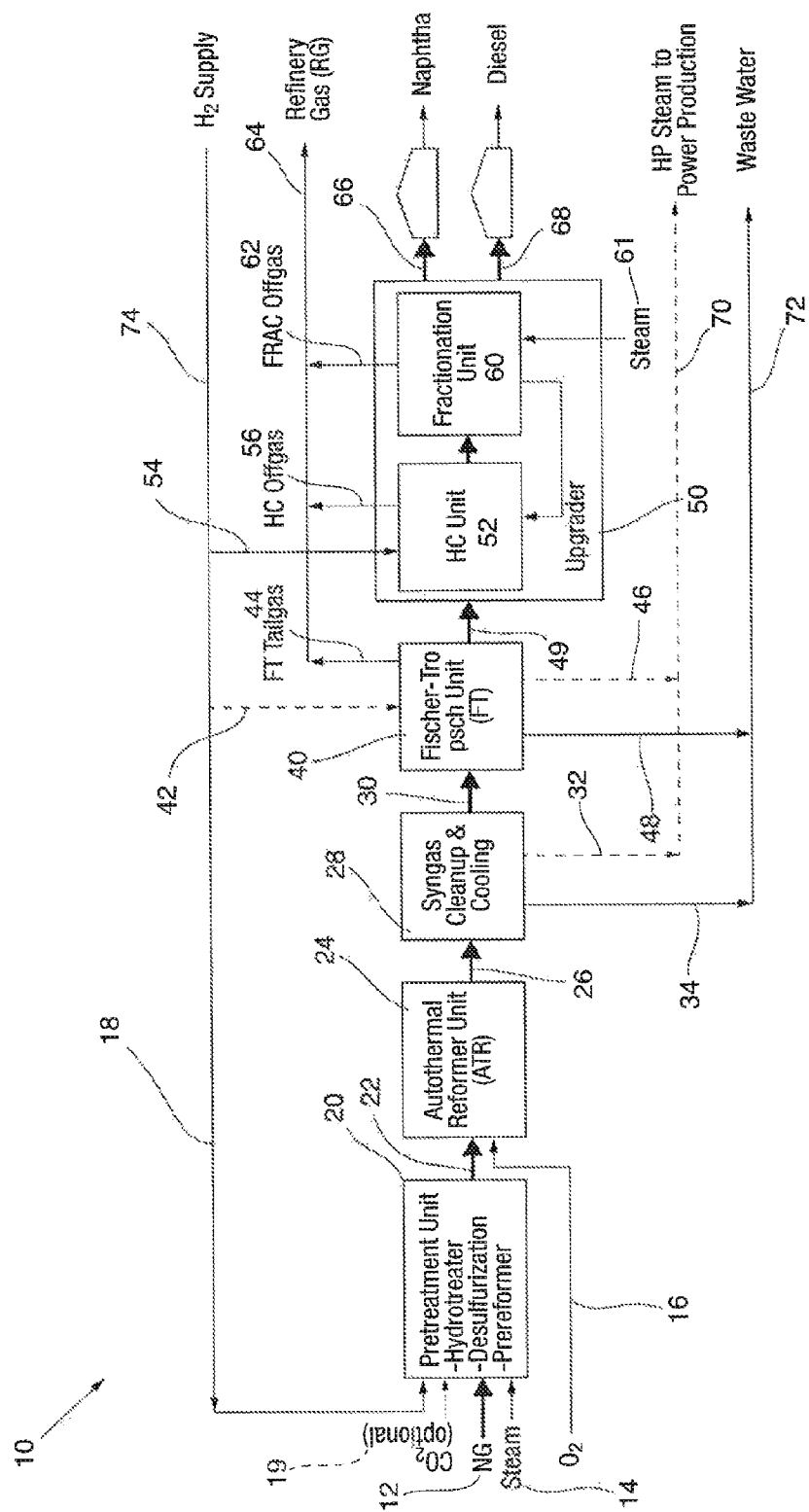
FIG. 1 is a process flow diagram of methodology known in the prior art using autothermal reformer technology.

Referring now to FIG. 1, to illustrate prior art, shown is a process flow diagram of a circuit for converting gas-to-liquids with the result being the production of naphtha and syndiesel. The process is generally denoted by numeral 10 and begins with a natural gas supply 12, which feedstock can be in the form of raw field gas or pipeline quality treated gas, usually with bulk sulfur and hydrocarbon liquids removed. The natural gas is then pre-treated in a pre-treatment unit 20 to which steam 14, hydrogen 18 and optionally carbon dioxide 19 may be added as required. The pre-treatment unit may include, as is well known to those skilled in the art, such unit operations as a feed gas hydrotreater, sulfur removal and quard operation and a pre-reformer to produce a clean vapour feed stream 22 for the syngas generator, denoted in FIG. 1 as an autothermal reformer (ATR) unit 24. The ATR 24 may be any suitable catalytic partial oxidization unit, however, as an example, an ATR that is useful in this process is that of Haldor Topsoe A/S., Uhde GmbH and CB&I Lummus Company. The ATR process and apparatus have been found to be effective in the methodology of the present invention and will be discussed hereinafter.

Generally, as is known from the ATR process, the same effectively involves a thermal catalytic stage which uses a partial oxygen supply 16 to convert the preconditioned natural gas feed to a syngas 26 containing primarily hydrogen and carbon monoxide.

The so formed syngas is then subjected to cooling and cleaning operations 28 with subsequent production of steam 32 and removal of produced water at 34. Common practice in the prior art is to employ the use of a water gas shift reaction (WGS) on the clean syngas 30 to condition the hydrogen to carbon dioxide ratio to near 2.0:1 for optimum conditions for the Fischer-Tropsch unit 40. It is not preferred in this process to include a WGS reaction as all the carbon, primarily as CO is retained and used to maximize production of synthesis liquids product. The process may optionally use the supplemental addition of hydrogen 42 to maximize the conversion to syndiesel. The raw syngas may be further treated, as is well known to those skilled in the art, in various steps of scrubbing units and guard units to remove ammonia and sulfur compounds to create a relatively pure clean syngas 30 suitable for use in a Fischer-Tropsch unit. A carbon dioxide removal unit (not shown) may optionally be included in the clean syngas stream 30 to reduce the inert load and maximize the carbon monoxide concentration to the Fischer-Tropsch unit 40. The syngas is then transferred to a Fischer-Tropsch reactor 40 to produce the hydrocarbons and water. The so formed hydrocarbons are then passed on to a product upgrader, generally denoted as 50, and commonly including a hydrocarbon cracking stage 52, a product fractionating stage 60 with naphtha being produced at 66 as a fraction, as well as diesel 68 as an additional product. The diesel 68 formulated in this process is commonly known as syndiesel. As an example, this process results in the formulation of 1000 barrels per day (bbl/day) based on 10 to 15 thousand standard cubic feet/day (MSCFD) of natural gas. As is illustrated in the flow diagram, a source of hydrogen 74 is to be supplemented to the hydrocarbon cracking unit 52 denoted as streams 54. Further, energy 32 from the syngas generator 24, typically in the form of steam, may be used to generate power and this is equally true of the Fischer-Tropsch reactor 40 creating energy 46.

Table 1 establishes a comparison between FT diesel and conventional petroleum based diesel.

TABLE 1

Specification of FT-diesel in comparison to conventional diesel

| Diesel Fuel Specification | FT-Diesel | Conventional Diesel |
|---|---|---|
| Chemical formula | Paraffin | $C_{12}H_{26}$ |
| Molecular weight (kg/kmol) | | 170-200 |
| Cetane number | >74 | 50 |
| Density (kg/l) at 15° C. | 0.78 | 0.84 |
| Lower Heating Value (MJ/kg) at 15° C. | 44.0 | 42.7 |
| Lower Heating Value (MJ/l) at 15° C. | 34.3 | 35.7 |
| Stoichiometric air/fuel ratio (kg air/kg fuel) | | 14.53 |
| Oxygen content (% wt) | ~0 | 0-0.6 |
| Kinematic viscosity (mm$^2$/s) at 20° C. | 3.57 | 4 |

TABLE 1-continued

Specification of FT-diesel in comparison to conventional diesel

| Diesel Fuel Specification | FT-Diesel | Conventional Diesel |
|---|---|---|
| Flash point (° C.) | 72 | 77 |

Source: KMITL Sci. Tech. J. Vol. 6 No. 1 January-June 2006, p. 43

As a further benefit, known to those skilled in the art, the process as described by FIG. 1 and all configurations of the current invention, the addition of a further side stripper column (not shown) off the fractionation in stage 60 may be included to produce a new fraction of about 25% of the volume of the syndiesel fuel (200 to 300 barrels per day (bbl/day)), referred to as FT-jet fuel. Table 2 describes a typical characteristic of FT jet fuel.

TABLE 2

Typical Specification of FT-Jet Fuel

| Typical Product Specification | FT Jet Fuel |
|---|---|
| Acidity mg KOH/g | 0.10 |
| Aromatics % vol max | <25.0 |
| Sulfur mass % | <0.40 |
| Distillation ° C. | Min 125° C. max 190° C. |
| 50% recovered | 270° C. |
| End Point | |
| Vapor Pressure kPa max | 21 |
| Flash Point ° C. | — |
| Density 15° C., kg/m3 | 750-801 |
| Freezing Point ° C. max | −51 |
| Net Heat Combustion MJ/kg min | 42.8 |
| Smoke Point mm, min | 20 |
| Naphthalenes vol % max | <3.0 |
| Copper Corrosion 2 hr @ 100° C., max rating | No 1 |
| Thermal Stability | |
| Filter Pressure drop mm Hg, max | 25 |
| Visual Tube rating, max | <3 |
| Static Test 4 hr @ 150° C. mg/100 ml, max | — |
| Existent Gum mg/100 ml, max | — |

Naphtha 66 can be generally defined as a distilled and condensed fraction of the Fischer-Tropsch FT hydrocarbon liquids, categorized by way of example with a typical boiling range of −40° C. to 200° C., more preferred 30° C. to 200° C., and more preferred 80° C. to 120° C. The specific naphtha specification will be optimized for each application to maximize syndiesel production, maximize the recovery of light liquid hydrocarbon fractions such as propane and butane and partially or fully eliminate the naphtha by-product.

Suitable examples of FT reactors include fixed bed reactors, such as tubular reactors, and multiphase reactors with a stationary catalyst phase and slurry-bubble reactors. In a fixed bed reactor, the FT catalyst is held in a fixed bed contained in tubes or vessels within the reactor vessel. The syngas flowing through the reactor vessel contacts the FT catalyst contained in the fixed bed. The reaction heat is removed by passing a cooling medium around the tubes or vessels that contain the fixed bed. For the slurry-bubble reactor, the FT catalyst particles are suspended in a liquid, e.g., molten hydrocarbon wax, by the motion of bubbles of syngas sparged into the bottom of the reactor. As gas bubbles rise through the reactor, the syngas is absorbed into the liquid and diffuses to the catalyst for conversion to hydrocarbons. Gaseous products and unconverted syngas enter the gas bubbles and are collected at the top of the reactor. Liquid products are recovered from the suspending liquid using different techniques such as separators, filtration, settling, hydrocyclones, and magnetic techniques. Cooling coils immersed in the slurry remove heat generated by the reaction. Other possibilities for the reactor will be appreciated by those skilled.

In the FT process, $H_2$ and CO combine via polymerization to form hydrocarbon compounds having varying numbers of carbon atoms. Typically 70% conversion of syngas to FT liquids takes place in a single pass of the FT reactor unit. It is also common practice to arrange the multiple FT reactors in series and parallel to achieve conversion levels of 90+%. A supplemental supply of hydrogen 42 may be provided to each subsequent FT reactor stages to enhance the conversion performance of the subsequent FT stages. After the FT reactor, products are sent to the separation stage, to divert the unconverted syngas and light hydrocarbons (referred to as FT tailgas), FT water and the FT liquids, which are directed to the hydrocarbon upgrader unit denoted as 50. The FT tailgas becomes the feed stream for subsequent FT stages or is directed to refinery fuel gas in the final FT stage. The upgrader unit typically contains a hydrocracking step 52 and a fractionation step 60.

Hydrocracking denoted as 52 used herein is referencing the splitting an organic molecule and adding hydrogen to the resulting molecular fragments to form multiple smaller hydrocarbons (e.g., $C_{10}H_{22}+H_2 \rightarrow C_4H_{10}$ and skeletal isomers+$C_6H_{14}$). Since a hydrocracking catalyst may be active in hydroisomerization, skeletal isomerization can occur during the hydrocracking step. Accordingly, isomers of the smaller hydrocarbons may be formed. Hydrocracking a hydrocarbon stream derived from Fischer-Tropsch synthesis preferably takes place over a hydrocracking catalyst comprising a noble metal or at least one base metal, such as platinum, cobalt-molybdenum, cobalt-tungsten, nickel-molybdenum, or nickel-tungsten, at a temperature of from about 550° F. to about 750° F. (from about 288° C. to about 400° C.) and at a hydrogen partial pressure of about 500 psia to about 1,500 psia (about 3,400 kPa to about 10,400 kPa).

The hydrocarbons recovered from the hydrocracker are further fractionated in the fractionation unit 60 and refined to contain materials that can be used as components of mixtures known in the art such as naphtha, diesel, kerosene, jet fuel, lube oil, and wax. The combined unit consisting of the hydrocracker 52 and hydrocarbon fractionator 60 are commonly known as the hydrocarbon upgrader 50. As is known by those skilled in the art, several hydrocarbon treatment methods can form part of the upgrader unit depending on the desired refined products, such as additional hydrotreating or hydroisomerization steps. The hydrocarbon products are essentially free of sulfur. The diesel may be used to produce environmentally friendly, sulfur-free fuel and/or blending stock for diesel fuels by using as is or blending with higher sulfur fuels created from petroleum sources.

Unconverted vapour streams, rich in hydrogen and carbon monoxide and commonly containing inert compounds such as carbon dioxide, nitrogen and argon are vented from the process as FT tail gas 44, hydrocracker (HC) offgas 56 and fractionator (frac) offgas 62. These streams can be commonly collected as refinery fuel gas 64 and used as fuel for furnaces and boilers to offset the external need for natural gas. These streams may also be separated and disposed of separately based on their unique compositions, well known to those skilled in the art.

A supplemental supply of hydrogen 74 may be required for the HC unit 54 and the natural gas hydrotreater 18. This hydrogen supply can be externally generated or optionally provided from the syngas stream 30 using a pressure swing absorption or membrane unit (not shown), although this feature will increase the volume of syngas required to be generated by the syngas generator 24.

Further, useable energy commonly generated as steam from the syngas stage, denoted by numeral 32, may be used to generate electric power. This is equally true of useable energy that can be drawn from the Fischer-Tropsch unit, owing to the fact that the reaction is very exothermic and this represents a useable source of energy. This is denoted by numeral 46.

Figure 2:
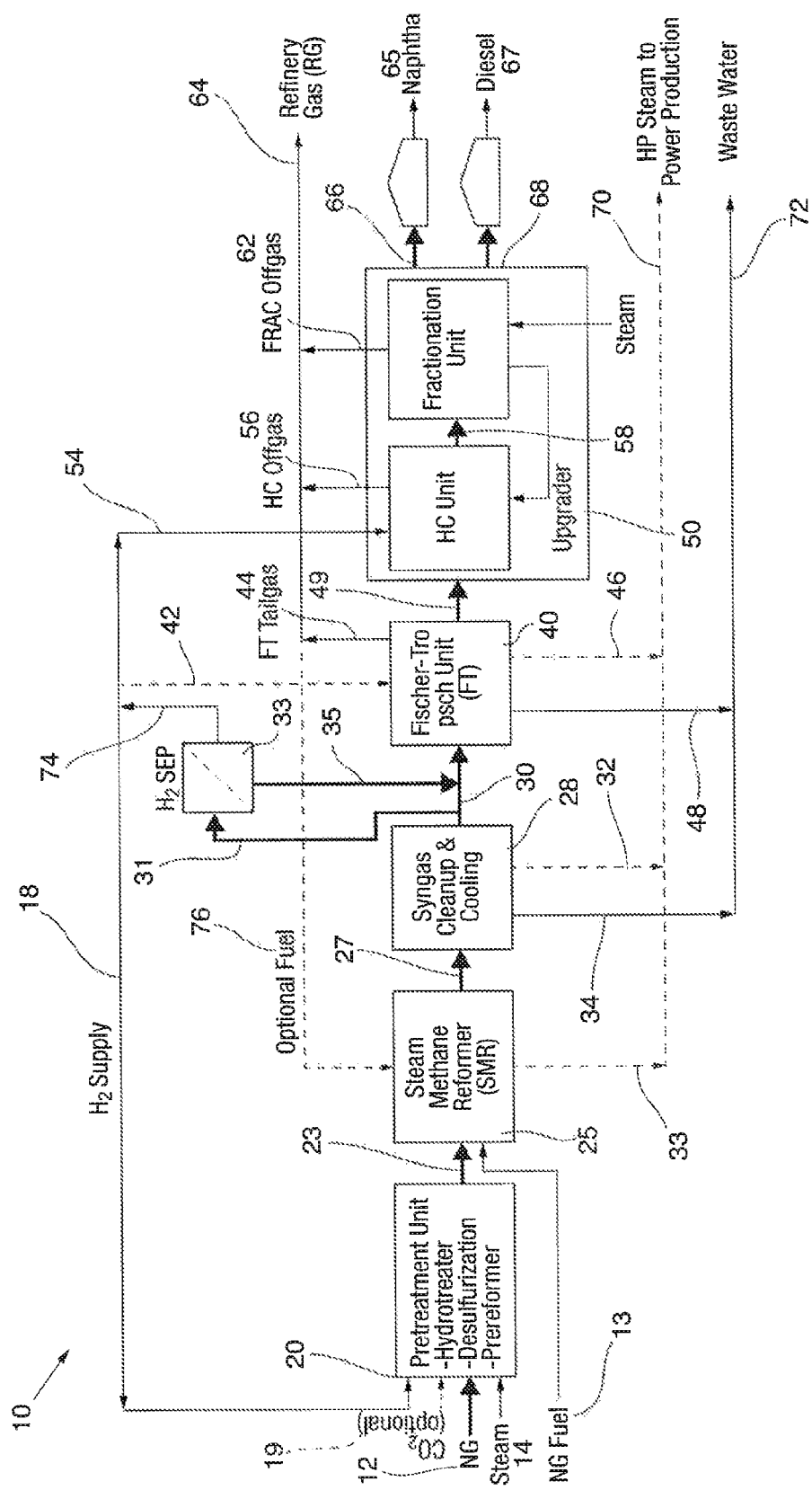
FIG. 2 is a process flow diagram of methodology known in the prior art using steam methane reformer technology.

Referring now to FIG. 2, to further illustrate the prior art, shown is an alternate process flow diagram of a circuit for converting gas-to-liquids with the result being the production of naphtha and syndiesel. The components of this process are generally the same as that described in FIG. 1 with the common elements denoted with the same numbers. For this process, the syngas generator is changed to be a steam methane reformer (SMR) 25. The SMR 25 may be any suitable catalytic conversion unit, however, as an example, an SMR that is useful in this process is that of Haldor Topsoe A/S., Uhde GmbH., CB&I Lummus Company, Lurgi GmbH/Air Liquide Gruppe, Technip Inc, Foster Wheeler and others. The SMR process and apparatus have been found to be effective in executing the methodology of the present invention to be discussed hereinafter. Generally, as is known from the SMR process, the same effectively involves a thermal catalytic stage which uses steam supply and heat energy to convert the preconditioned natural gas feed to a syngas 27 containing primarily hydrogen and carbon dioxide.

An advantage of the SMR technology is that the syngas is very rich in hydrogen with a ratio of hydrogen to carbon monoxide typically greater than 3.0:1. This exceeds the typical syngas ratio of 2.0:1 usually preferred for the Fischer-Tropsch process. As such, a hydrogen separation unit 33 may be used to provide the hydrogen requirement 74 for the GTL process. As discussed previously, well known to those skilled in the art, the hydrogen separator may be a pressure swing adsorption or a membrane separation unit. Further, although the SMR does not require an oxygen source as with the ATR technology, the SMR process requires external heat energy, typically provided by natural gas 13 or optionally by use of the excess refinery gas 76 derived from the FT tail gas 44 or upgrader offgases 56 & 62.

The SMR 25 may contain any suitable catalyst and be operated at any suitable conditions to promote the conversion of the hydrocarbon to hydrogen $H_2$ and carbon monoxide. The addition of steam and natural gas may be optimized to suit the desired production of hydrogen and carbon monoxide. Generally natural gas or any other suitable fuel can be used to provide energy to the SMR reaction furnace. The catalyst employed for the steam reforming process may include one or more catalytically active components such as palladium, platinum, rhodium, iridium, osmium, ruthenium, nickel, chromium, cobalt, cerium, lanthanum, or mixtures thereof. The catalytically active component may be supported on a ceramic pellet or a refractory metal oxide. Other forms will be readily apparent to those skilled.

Figure 3:
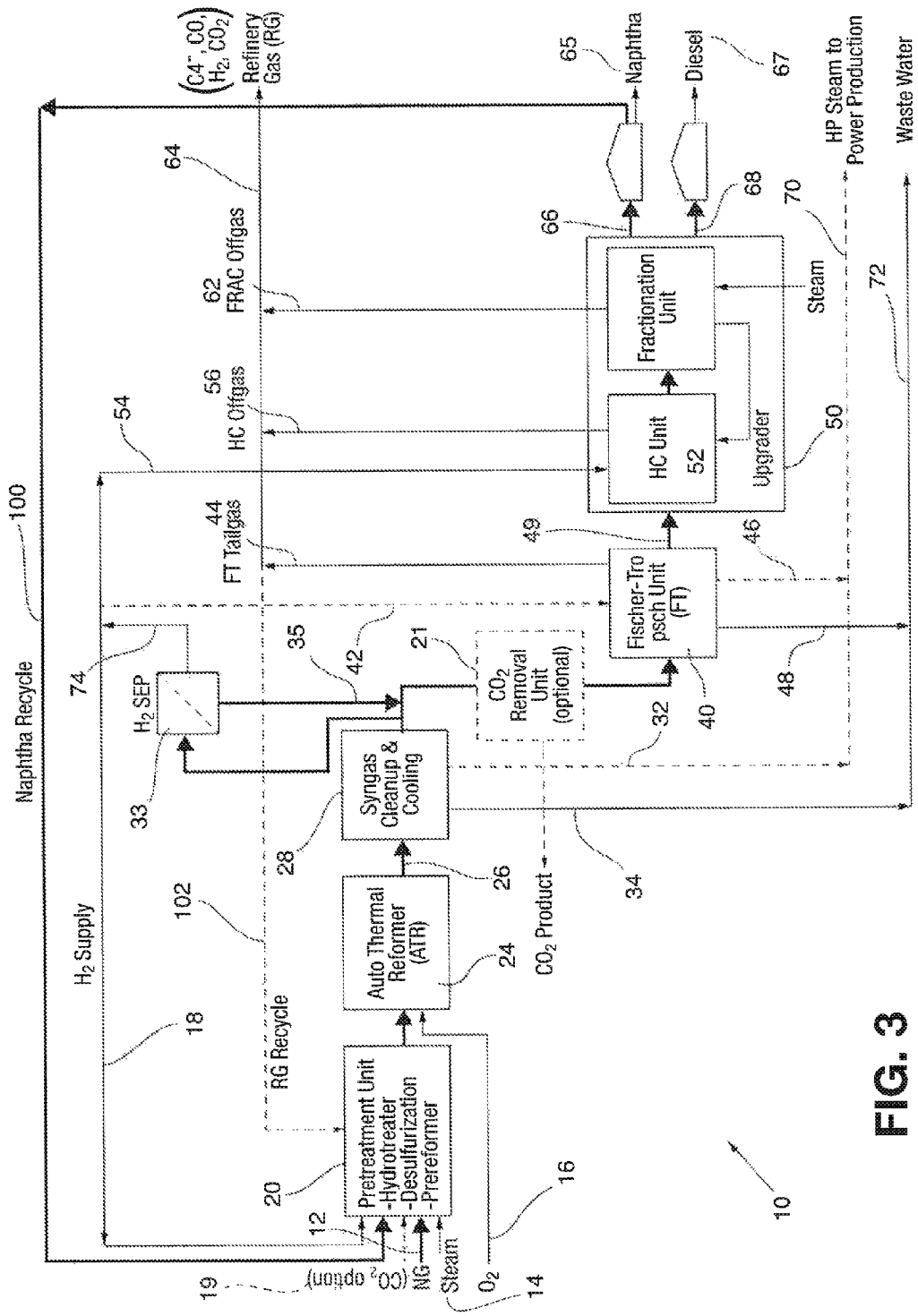
FIG. 3 is a process flow diagram similar to FIG. 1, illustrating a first embodiment of the present invention.

Turning now to FIG. 3, shown is a preliminary embodiment of the technology of the instant invention. As is evinced from FIG. 3, many of the preliminary steps are common with that which is shown in FIG. 1. At least a portion of the less desirable FT product, naphtha 66 is recycled as ATR 24 feed through the pre-treatment unit 20 and is fully destroyed and converted to additional syngas. Based on the full recycle and conversion of the naphtha, the diesel production increase of greater than 10% can be realized, with the elimination of an undesirable by-product stream.

As a key point, one of the most effective procedures in the instant technology, relates to the fact that once the product fractionation stage has been completed and the naphtha 66 formulated, it has been found that by recycle and full conversion of the naphtha, significant results can be achieved in the production of the synthetic diesel.

In the embodiment shown in FIG. 3, several other optional features are desirable in addition to naphtha recycle, to enhance the production of syndiesel, including;

(i) a hydrogen separation unit is added to remove excess hydrogen from the enhanced syngas for supply to the FT unit 40 and product upgrader 50;

(ii) A portion of hydrogen rich streams not desired to be used as fuel, separately or combined all together as refinery fuel 64, can be recycled back 102 to the ATR 24 by way of the pre-treatment unit 20;

(iii) A optional carbon dioxide removal stage 21 may be installed on the FT syngas feedstream to reduce the inert vapour load on the FT unit 40, and at least a portion of the carbon dioxide 12 may be reintroduced into the ATR 24 by way of the pre-treatment unit 20 for purposes of reverse shifting and recycling carbon to enhance the production of syndiesel.

As has been discussed herein previously, it is unusual and most certainly counter-intuitive to effectively destroy the naphtha in order to generate a hydrogen rich stream as the naphtha is commonly desired as primary feedstock for gasoline production. Although this is the case, it is particularly advantageous in the process as set forth in FIG. 3.

Figure 4:
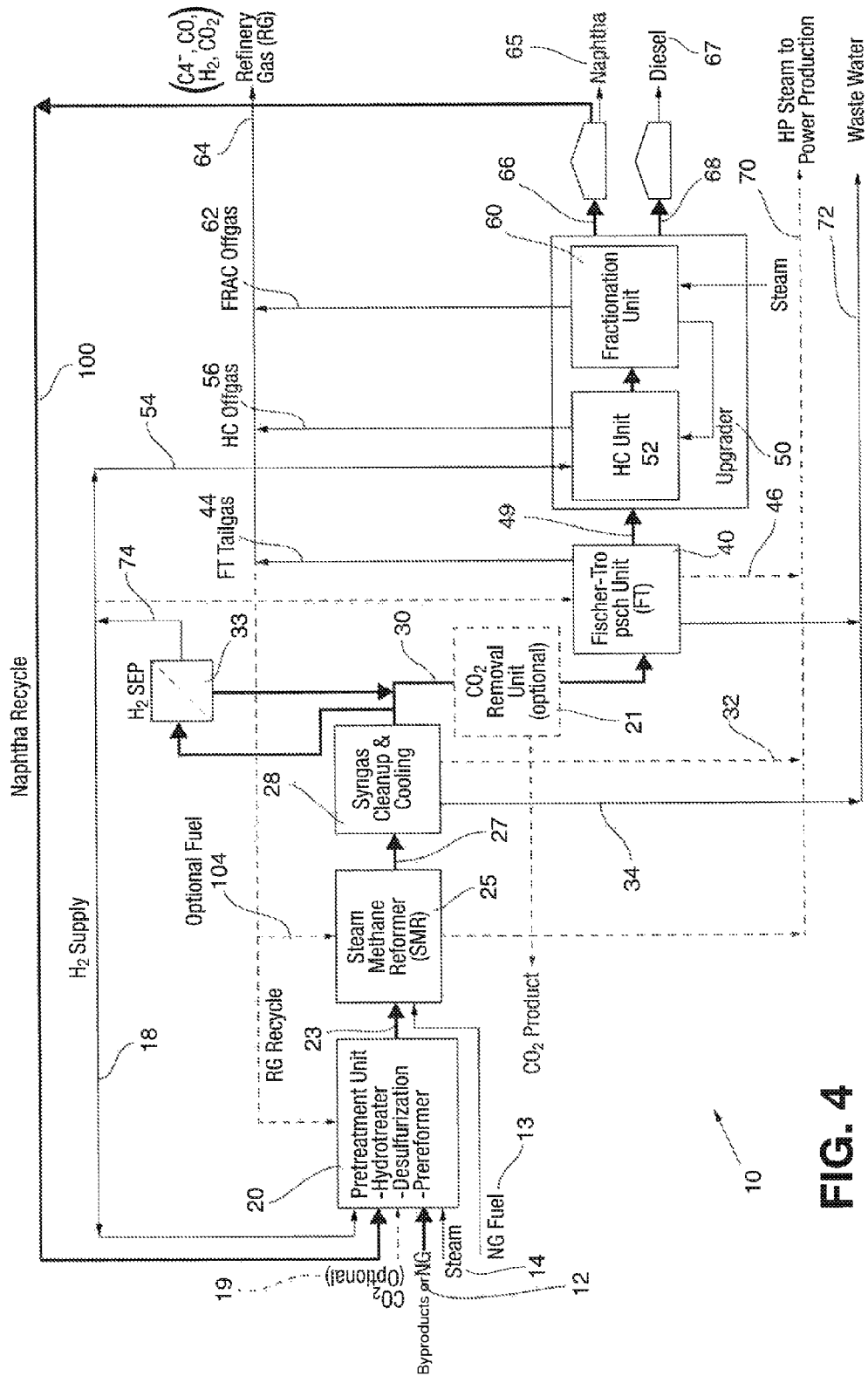
FIG. 4 is a process flow diagram similar to FIG. 2, illustrating a further variation of the present invention.

FIG. 4 sets forth a further interesting variation on the overall process that is set forth in FIGS. 2 and 3. As is evinced from FIG. 4, many of the preliminary steps are common with that which is shown in FIG. 2. In this variation, and similar to the variation described by FIG. 3, the process employs the recycle of at least a portion of the naphtha 100 to enhance the production of syndiesel using a SMR syngas generator. Similarly the optional features described for FIG. 3 can equally apply to FIG. 4.

Figure 5:
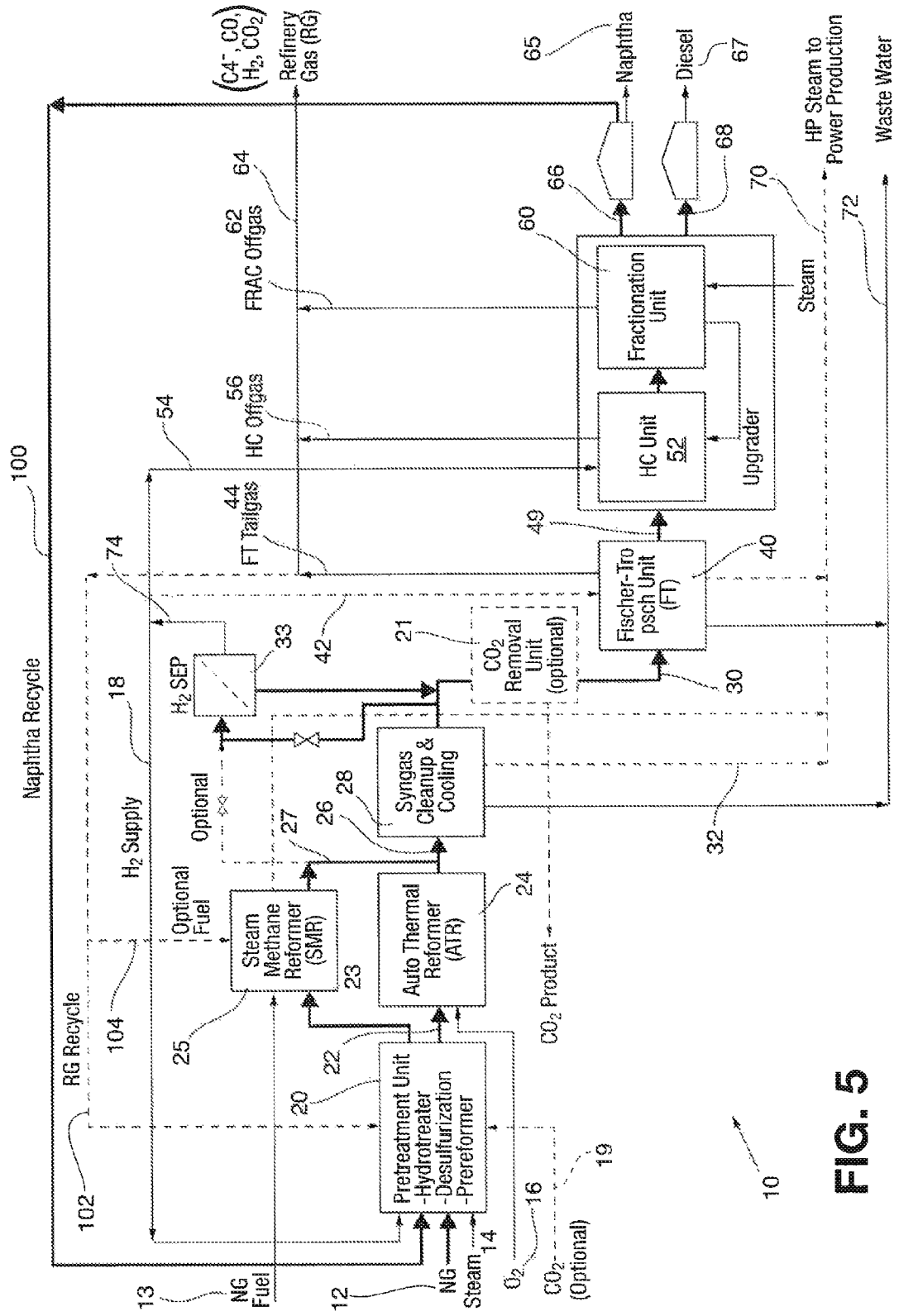
FIG. 5 is a process flow diagram of a still further embodiment of the present invention showing the combination of autothermal and steam methane reforming technologies.

A further variation of the overall process embraced by the technology discussed herein is shown in FIG. 5. In essence, the process flow as shown in FIG. 5 combines the unit operations of the SMR 25 and the ATR 24 syngas generators with the primary embodiment of this invention, namely the recycle of at least a portion of the naphtha, to create the maximum conversion of carbon to syndiesel. Further, the optional features as described in FIGS. 3 and 4, combined with the naphtha recycle, may create even further benefits to further enhancement of syndiesel production without any nonuseful by-products. The sizing of the ATR and SMR syngas generators are specific to each feed gas compositions and site specific parameters to optimize the production of syndiesel. Further the feedstreams for the ATR and SMR may be common or uniquely prepared in the pre-treatment unit to meet specific syngas compositions desired at 26 and 27. Similarly, the hydrogen rich syngas stream or portion thereof, from the SMR can be optionally preferred as the feed stream to the hydrogen separation unit 33. By way of example, the preferred steam to carbon ratios at streams 22 and 23 for the ATR and SMR may be different, thereby requiring separate pre-treatment steps.

Figure 6:
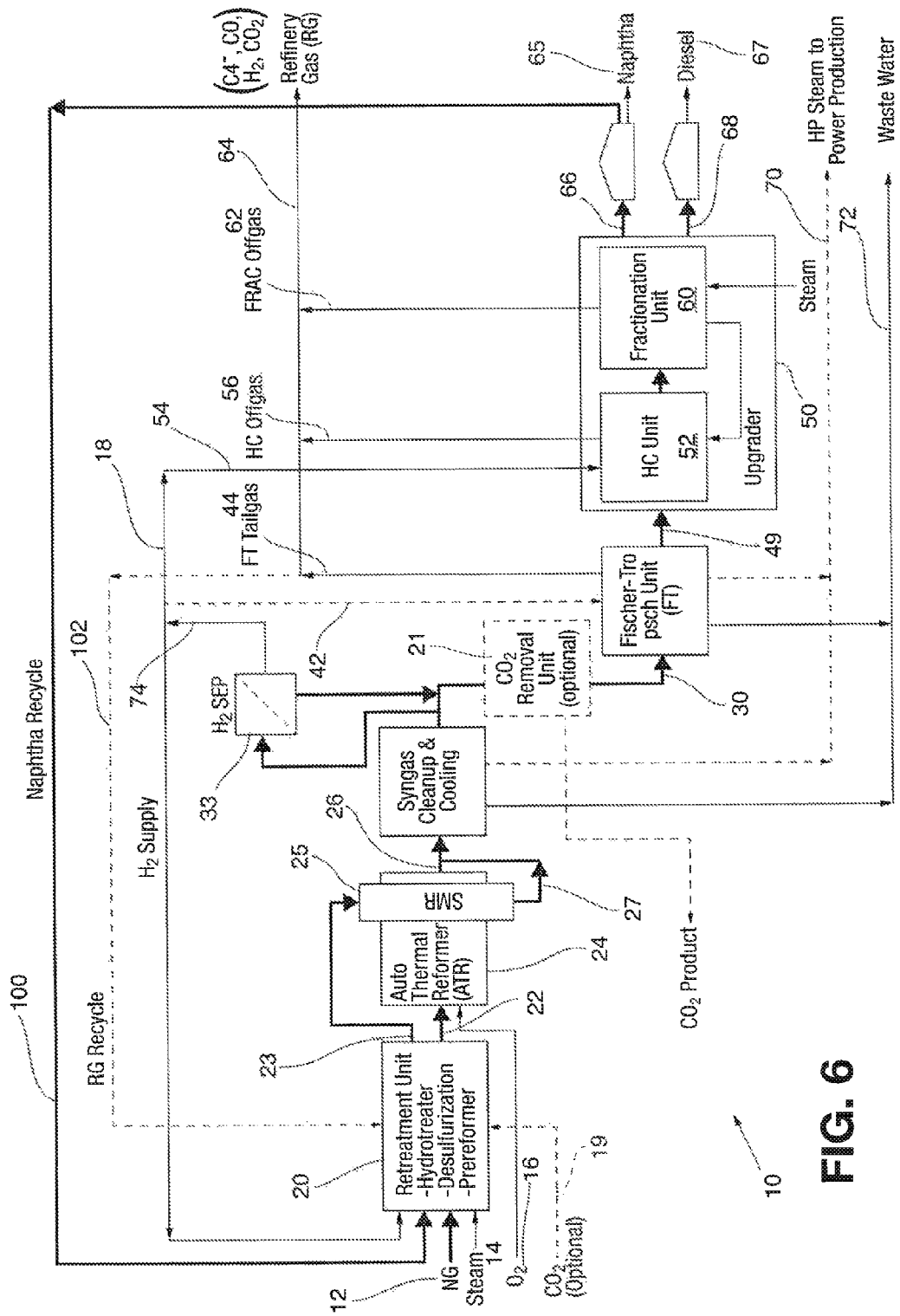
FIG. 6 is a process flow diagram illustrating a still further variation of the present methodology, showing the integration of the autothermal and steam methane technologies.

Turning to FIG. 6, as shown is yet another variation of the overall process according to the present invention combining the benefits of FIGS. 3 and 4. In this embodiment, both the SMR and ATR unit operations, combined with the naphtha recycle are amalgamated into an integrated unit operation whereby the heat energy created by the ATR 24 becomes the indirect heat energy required by the SMR reactor tubes 25. This embodiment allows the integrated ATR/SMR unit, the XTR to be strategically designed to maximize the carbon conversion to syndiesel by creating the optimum Fischer-Tropsch 40 and hydrogen separator 33 syngas feed with optimum hydrogen to carbon monoxide ratio and the minimum quantity of natural gas, steam and oxygen, while maximizing syndiesel production without the production of any nonuseful by-product. All other optional features remain the same as FIGS. 3, 4 and 5. As used herein, "integrated" in reference to the ATR/SMR means a merged unit where the two distinct operations are merged into one.

Figure 7:
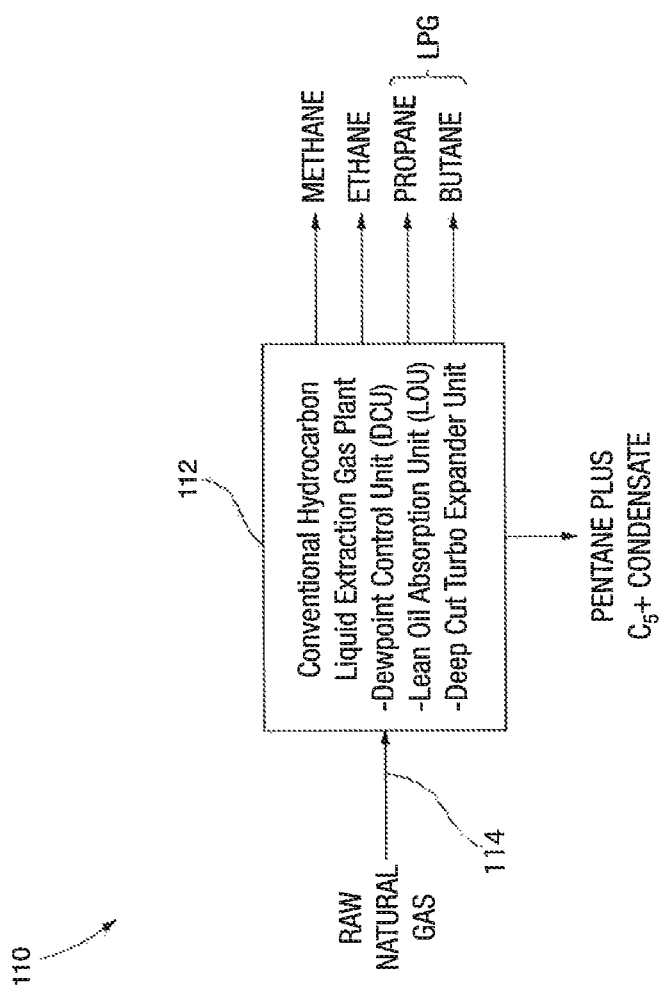
FIG. 7 is a schematic diagram illustrating a conventional hydrocarbon liquids extraction plant.

Turning to FIG. 7, shown is a schematic illustration of a conventional hydrocarbon liquids extraction plant commonly known in the art. The overall plant is denoted with numeral 110. The hydrocarbon liquid extraction gas plant typically includes refrigerated dewpoint control units, lean oil absorption plants or deep cut turbo expander plants. All of these process units employ an extraction technique to remove ethane, propane, butane and pentanes as well as higher alkanes referred to as pentanes plus $C_5+$ (typically referred as condensates) singly or as blends from the methane gas stream. These techniques are well known and will not be elaborated upon here. Generally speaking, any of the above mentioned alkanes other than the $C_5+$ alkanes can remain in the sales gas to increase heat content provided that the sales gas hydrocarbon dewpoint specification is not exceeded.

Figure 8:
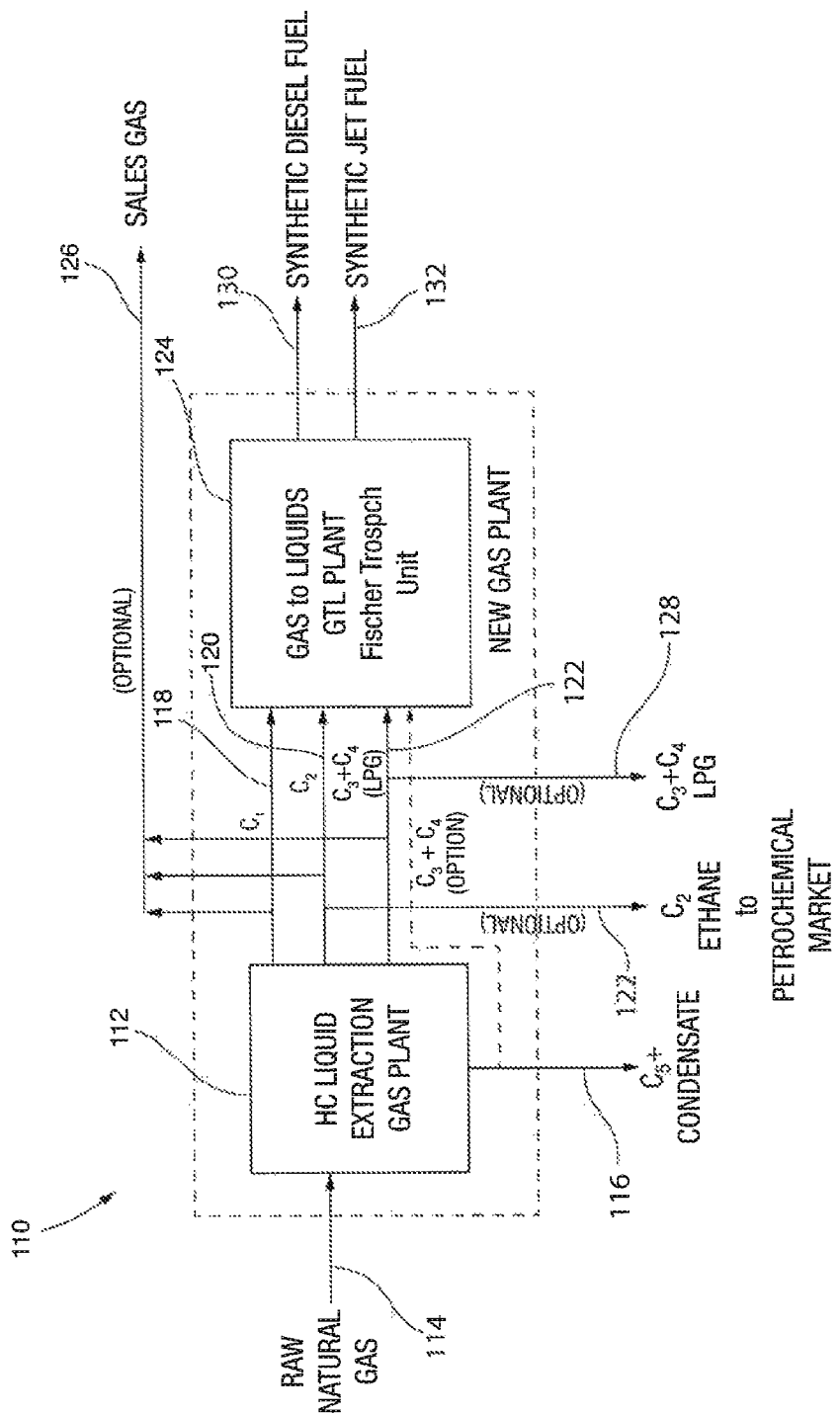
FIG. 8 is a process flow diagram illustrating a still further variation of the present methodology within a natural gas processing facility Similar numerals employed in the figures denote similar elements.

Turning now to FIG. 8, shown is a further variation of the methodology of the present invention. The original feedstock, namely raw natural gas 114 is introduced into the plant 112 at which point the $C_5+$ condensates can be removed at 116 with the passage of the methane 118, ethane 120, and propane and butane 122 introduced into a gas to liquids GTL plant 124, which includes a Fischer-Tropsch unit.

As an option, at least a portion of the methane 118, ethane 120 and butane and propane 122 can be removed as sales gas 126 or in the case of the ethane 120 this may be supplied optionally to the petrochemical market. Similarly, with respect to the propane (C3) and butane (C4) 122 this may be entirely removed or a portion thereof from the circuit at 128.

As is known, once the alkane feedstock is passed into the gas to liquid plant 124 by use of the known components of the gas to liquid plant including, namely the syngas generator, syngas conditioning circuit, and upgrading circuit, the result is synthetic diesel fuel 130 and/or synthetic jet fuel 132 as illustrated in the Figure.

The GTL plant 124 is capable of receiving the combined raw gas stream with primarily the $C_5+$ components removed for converting the rich raw natural gas to synthetic diesel and synthetic jet fuel. It has been found that over dry methane gas feed, the GTL plant 124 will generate a 20% to 30% increase in synthetic diesel product yield using the rich natural gas feed. It is also been noted that a significant increase in synthetic diesel production is realized as the composition contains high concentrations of butane and propane. It has further been found that if the feed is restricted to 100% propane or butane, the synthetic diesel production increases two to three times respectively to approximately 200% to 300% of the production based on dry methane gas.

It will be appreciated that the feedstock can take any form and can include any combination of the byproducts or any of the byproducts singly, namely, the $C_2+$, $C_3+$, $C_3$ and $C_4$ and/or $C_5+$. The arrangement is particularly beneficial, since the operator can select an option to adjust the economical business model to optimize the economics for a particular market situation.

Clearly there are significant advantages that evolve from unifying the gas plant with the use of the byproduct technology set forth herein. These include, for example:

i) Production of natural gas to be sustained during surplus natural gas market conditions;
ii) The use of unfavourable natural gas components (byproducts) which can be reformed to high value synthetic diesel and synthetic jet fuel to increase market potential; and
iii) The use of rich feed streams to the GTL plant to dramatically increase synthetic diesel production.

With respect to the efficiency of the overall system, in Table 3 there is tabulated information regarding the natural gas feed and the result of total synthetic diesel production.

TABLE 3

Overall Process Summary of GTL

| | Pipeline Natural Gas | Case 1 Mixed GTL Feed | Case 2 LPG Blend | Case 3 Pure Propane | Case 4 Pure Butane |
|---|---|---|---|---|---|
| GTL Feedstock | | | | | |
| Feed Rate (MMSCFD) | 12.5 | 12.5 | 12.5 | 12.5 | 12.5 |
| Feed Composition (mole fraction) | | | | | |
| Nitrogen | 0.0197 | 0.0 | 0.0 | 0.0 | 0.0 |
| Methane | 0.9700 | 0.8 | 0.0 | 0.0 | 0.0 |
| Ethane | 0.0010 | 0.0 | 0.0 | 0.0 | 0.0 |
| Propane | 0.0040 | 0.1 | 0.5 | 1.0 | 0.0 |
| Butane | 0.0040 | 0.1 | 0.5 | 0.0 | 1.0 |
| Pentane Plus | 0.0013 | 0.0 | 0.0 | 0.0 | 0.0 |
| Total Diesel Product (bpd) | 996.5 | 1179.0 | 2748 | 2355.0 | 3093 |

As is evident from the Table, the natural gas feed to the GTL circuit has a total diesel production barrels per day (bpd) of 996.5. Cases 1 though 4 vary the feed composition to the GTL circuit with very pronounced results. In the instance of Case 4 where the feed is straight butane, the result is 3093 bpd of syndiesel which, represents approximately a 300% increase from the use of conventional natural gas with all of the byproducts present. Case 3 indicates straight propane as an option with an indicated total syndiesel product of 2355 bpd. Case 2 demonstrates a mix between propane and butane as the feedstock, also illustrating a significant increase in product yield showing 2748 bpd of syndiesel relative to the use of natural gas only. It will be appreciated that in the instances of Cases 1 through 4, these are demonstrative of the increase in volume of the syndiesel produced when used in combination with the typical natural gas composition under column Pipeline Natural Gas.

Clearly, the methodology facilitates an increased yield of synthetic fuel production by use of natural gas byproducts with or without natural gas. This advantageously provides process flexibility and definition economics.

The invention claimed is:

1. A method for converting natural gas byproducts to synthetic fuel, comprising:
    providing a source of natural gas;
    extracting byproducts comprising ethane, propane, butane, pentane plus or mixtures thereof from said natural gas, wherein said byproducts are free of methane;
    feeding at least a portion of one or more of said byproducts to a steam methane reformer to directly produce a hydrogen rich syngas stream; and
    catalytically converting said syngas to said synthetic fuel in a fuel synthesis circuit including a Fischer Tropsch reactor.

2. The method as set forth in claim 1, wherein said natural gas is processed to generate a gas phase and a hydrocarbon liquid phase from said natural gas.

3. The method as set forth in claim 2, further including the step of fractioning said hydrocarbon liquid phase to separate methane, and said ethane, propane, butane, pentane plus or mixtures thereof in a predetermined amount.

4. The method as set forth in claim 3, wherein said ethane is removed from said feedstock prior to introduction of said feedstock into said fuel synthesis circuit.

5. The method as set forth in claim 3, wherein said propane is removed from said feedstock prior to introduction of said feedstock into said fuel synthesis circuit.

6. The method as set forth in claim 3, wherein said butane is removed from said feedstock prior to introduction of said feedstock into said fuel synthesis circuit.

7. The method as set forth in claim 1, wherein said synthetic fuel is synthetic diesel.

8. The method as set forth in claim 1, wherein said synthetic fuel is synthetic jet fuel.

9. The method as set forth in claim 1, wherein said fuel synthesis circuit comprises a gas to liquids (GTL) plant.

10. The method as set forth in claim 1, wherein said natural gas is pretreated prior to extraction to remove pentane and higher alkanes.

11. The method as set forth in claim 1, which comprises feeding said ethane as said feedstock.

12. The method as set forth in claim 1, which comprises feeding said propane as said feedstock.

13. The method as set forth in claim 1, which comprises feeding said butane as said feedstock.

14. The method as set forth in claim 1, which comprises feeding a mixture of said propane and butane as said feedstock.

15. The method of claim 1, wherein the hydrogen to carbon monoxide ratio is greater than 3:1.

16. The method of claim 15, wherein the hydrogen to carbon monoxide ratio is from 3:1 to 5:1.

17. A method for preparing synthetic hydrocarbons, comprising the steps of:
   providing a source of natural gas;
   extracting byproducts comprising ethane, propane, butane, pentane plus or mixtures thereof from said natural gas, wherein said byproducts are free of methane;
   feeding at least a portion of one or more of said byproducts to a steam methane reformer to directly produce a hydrogen rich syngas stream;
   catalytically converting said hydrogen rich syngas stream in a Fischer Tropsch reactor to produce said synthetic hydrocarbons, containing at least naphtha;
   recycling at least a portion of said naphtha to said syngas generator to form an enhanced hydrogen rich syngas stream; and
   re-circulating said enhanced hydrogen rich syngas stream for conversion to enhance the formulation of synthetic hydrocarbons.

18. The method a set forth in claim 17, wherein said synthetic hydrocarbons include synthetic diesel.

19. The method as set forth in claim 17, wherein said synthetic hydrocarbons include synthetic jet fuel.

20. The method of claim 17, wherein the hydrogen to carbon monoxide ratio is greater than 3:1.

21. The method of claim 20, wherein the hydrogen to carbon monoxide ratio is from 3:1 to 5:1.

22. A method of preparing synthetic hydrocarbons, comprising the steps of:
   providing a source of natural gas;
   extracting byproducts comprising ethane, propane, butane, pentane plus or mixtures thereof from said natural gas, wherein said byproducts are free of methane;
   feeding at least a portion of one or more of said byproducts to a steam methane reformer to directly produce a hydrogen rich syngas stream;
   catalytically converting said rich syngas stream in a Fischer Tropsch reactor to produce synthetic hydrocarbons, containing at least naphtha and unconverted FT (Fischer-Tropsch) vapours;
   recycling at least a portion of said naphtha and unconverted FT vapours to said syngas generator to form an enhanced hydrogen rich syngas stream; and
   re-circulating said enhanced hydrogen rich stream for conversion to enhance the formulation of synthetic hydrocarbons.

23. The method a set forth in claim 22, wherein said synthetic hydrocarbons include synthetic diesel.

24. The method as set forth in claim 22, wherein said synthetic hydrocarbons include synthetic jet fuel.

25. The method of claim 22, wherein the hydrogen to carbon monoxide ratio is greater than 3:1.

26. The method of claim 25, wherein the hydrogen to carbon monoxide ratio is from 3:1 to 5:1.

* * * * *